Francis R. Russell Inventor
By W. O. T. Heilman Attorney

Francis R. Russell Inventor
By W. O. Heilman Attorney

Francis R. Russell Inventor
By W. O. Heilman Attorney

Patented Jan. 20, 1953

2,626,289

UNITED STATES PATENT OFFICE 2,626,289

PROCESS FOR POLYMERIZATION IN THE PRESENCE OF A FLUID SOLID POLYMERIZATION CATALYST

Francis R. Russell, Mountainside, N. J., assignor to Standard Oil Development Company, a corporation of Delaware Application March 30, 1950, Serial No. 152,825

18 Claims. (Cl. 260—683.15)

The present invention relates to the polymerization of olefins, and more particularly to the polymerization of normally gaseous olefins to liquid hydrocarbons comprising essentially aliphatic polymers or copolymers suitable for use in the manufacture of motor fuel.

According to one aspect, the present invention relates to a two stage polymerization of a mixed olefin feed, containing for example, ethylene, propylene, and butylene, wherein the hydrocarbons are agitated in a first stage with a polymerizing catalyst suspended therein at temperatures between 350° and 600° F. and pressures above those required to condense the gases at the critical temperature, i. e. pressures above the critical, and wherein the effluent from this zone is contacted with the same or different catalyst in either a stationary bed or a bed otherwise having relatively little top to bottom mixing.

The manner in which the present process is carried out will be fully understood from the following description when read with reference to the accompanying drawings wherein.

Figure 1:
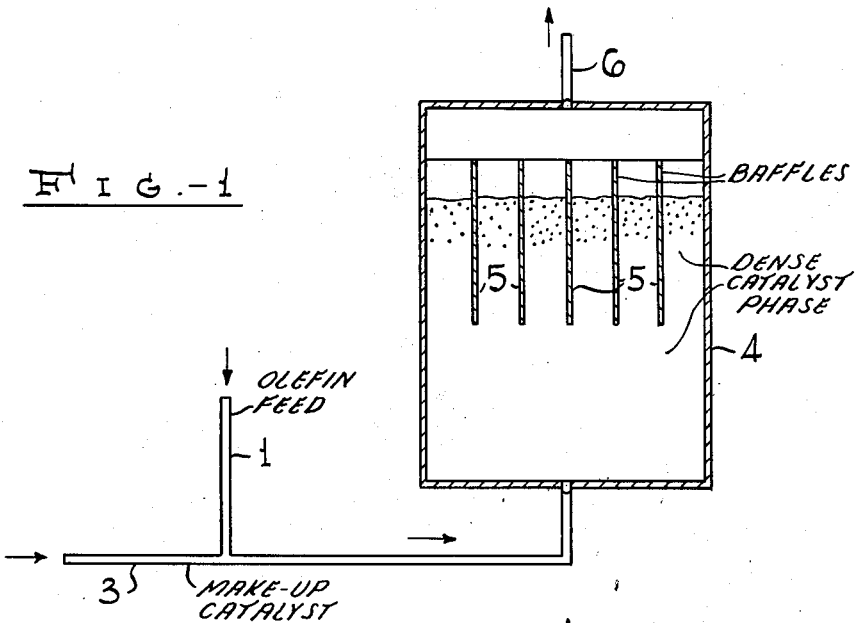
Fig. 1 is a semi-diagrammatic view in sectional elevation of a single reactor provided with space for thoroughly mixing the reactant with the catalyst and above this a zone provided with baffles wherein little or no mixing occurs.

Conventional polymerization processes utilize a moderately active catalyst in a fixed bed operation. The catalyst is packed inside long tubes around which a cooling medium circulates. These tubes are normally 2 to 5 inches in diameter. Another type process utilizes large chambers packed with the catalyst. Due to the large amount of heat produced in the polymerization reaction, more or less local overheating occurs in these catalyst beds, whether in tubes or chambers, and much of the catalyst in the bed is therefore deactivated as the process proceeds; usually only a small portion of the catalyst is actually being efficiently utilized at any given time. In the initial stages of the process the initial 20 or 30 per cent of the catalyst is doing the bulk of the polymerization; later this catalyst will become inactive and often fused together so that only the last portions of the catalyst are being used.

In copending application, Serial No. 152,858, filed March 30, 1950, in the name of William K. Fell and John D. Leslie, it has been suggested that this difficulty might be overcome by utilizing a fluidized solid or slurry type operation with finely divided catalyst suspended in or slurried in the fluid reactants, at pressures above the critical. Good mixing is generally a criterion of a successful fluid or slurry operation with the result that composition and temperature throughout the reaction zone are quite uniform. Under these conditions, a fair olefin concentration would of necessity exist throughout the reactor, possibly as much as 5 to 10 per cent. If much lower olefin concentration were used, the rate of reaction would suffer and a much larger reaction zone or vessel would be required. On the other hand, an appreciable olefin concentration means that the fluid leaving the reaction zone will contain appreciable unreacted olefin, thus resulting in a low conversion for the process. With a well fluidized bed, then, it will be difficult or expensive to attain high conversions. Due to the high heat transfer coefficient realized in such a fluid or slurry operation, the cooling surface required can be relatively small and can be further minimized by introducing the reactants cold so that the heat of reaction can be used to supply the sensible heat of the incoming feed. Thus, a fluid or slurry operation offers several advantages over the fixed bed operation but has the one disadvantage that serious loss of unreacted olefin would usually result.

To overcome the disadvantage of the fluid or slurry process, the present invention proposes to maintain two reaction zones, one a well fluidized, well mixed zone of the fluid or slurry operation, followed by a zone in which top to bottom mixing is relatively poor or nonexistent for cleaning up the olefin remaining in the products from the well mixed zone. This may be a fixed bed catalyst of the usual type or pills or lumps packed in tubes properly cooled or it can be a bed of pilled catalyst with a few cooling tubes passing through it. In this way the material in the fluid bed could be maintained at a sufficiently high olefin concentration to establish good reaction rates and yet the products leaving the fixed bed zone would be relatively low in olefin concentration and therefore represent a high overall conversion for the process. If desired, this non-mixing zone could be a second reactor filled with fixed bed catalyst through which the products from the first reactor pass.

In another embodiment the zone of good mixing is followed by a zone with relatively poor mixing so that an olefin concentration gradient will exist between the inlet and outlet of this latter zone. Such a zone can be realized either in a separate reactor with powdered catalyst or in the same reactor if suitable baffles or tubes are installed at the outlet of the fluidized or well mixed zone. Thus, a fluid reactor might consist of a large reaction space with little or no encumbrance other than possibly a few cooling tubes for heat exchange in the lower half and the upper half baffled or filled with vertical tubes or packing. These baffles, tubes, or packing would serve to prevent top to bottom mixing which is characteristic of the large and open fluid bed and would therefore permit the mixture entering the baffles with maybe 5 per cent olefins to leave with 1 per cent or less olefin remaining. Under these conditions the clean-up of the olefin, which involves but little heat release, will permit a high overall conversion for the process. Obviously, the combined operation can be carried out in two separate vessels if desired, one a fluid vessel with good mixing and the other a fluid vessel with poor mixing caused by the use of vertical baffles, packing, trays or internal tubes in this reactor. The feed material would be subjected to the major portion of the polymerization reaction in the fluid bed where the heat could be easily removed and where mixing was sufficiently good to permit introduction of the feed cold to utilize most of the heat of reaction. Then the partially reacted mixture would pass to the zone of poor mixture where the remaining olefin would be reacted to clean up the olefin from the product stream and result in an overall high olefin conversion. In any of the above embodiments it may be desirable to employ different catalysts in the two zones, preferably catalysts having different activities usually with the less active catalyst in the first zone and the more active catalyst in the second zone.

Suitable catalysts for use in the present process include phosphoric acid deposited on kieselguhr or other carrier. A particularly active catalyst for use in the second stage comprises 50% to 90% phosphoric acid deposited on silica gel promoted with 1% to 5% of either nickel or copper phosphate. Temperatures vary between 350° and 600° F., preferably between 400° and 500° F. in both zones, while pressures of at least 900 lbs. per sq. in. gage should be employed in the first stage. Pressures in the second stage may be from 100 to about 1000 lbs. or more, preferably 800 to 1000 lbs. It is preferable that only one fluid phase be maintained in the first stage and therefore the pressure should be kept above the critical and above the phase-boundary loop where both liquid and vapor phases coexist. This is not essential in the second stage if a fixed catalyst bed is used. Good mixing is also necessary in the first stage and may be accomplished either by passing the fluid reactants upwardly through the catalyst or by the use of mechanical agitation. It is necessary, therefore, that the catalyst in the first stage be in finely divided form, preferably between 60 and 200 mesh. It is preferable that the finely divided catalyst be restricted to a narrow range within these limits, e. g. 60–80, 80–100, 100–120, 120–140, etc. In the second stage, the catalyst may be finely divided or coarse, as desired.

In accordance with the invention, therefore, the fluid reactants are mixed with a finely divided phosphoric acid on kieselguhr catalyst maintained at a pressure above the critical and outside the region wherein two fluid phases coexist. The catalyst is suspended in the fluid reactants either by passing it upwardly therethrough or by mechanical agitation. Effluent from this stage which at moderate velocities of flow will be free of entrained catalyst is passed through a second stage which may be a stationary bed or relatively quiescent slurry employing a more active catalyst.

Referring now to Fig. 1, olefins to be polymerized are introduced by line 1 and mixed with make-up polymerization catalyst periodically or continuously introduced through line 3 and passed into the bottom of reaction zone 4. Temperatures are maintained at about 450° F. and pressure at 1000 lbs./sq. in. gage. The reactants pass upwardly through the catalyst in reactor 4 at such a linear velocity that the catalyst is maintained in suspension in the bottom portion of the reactor. By this means thorough mixing in the lower portion of the reactor 4 is obtained. The upper portion of reactor 4 is provided with baffles 5 between which the catalyst penetrates. In this zone there is very little top to bottom mixing of the fluid and the catalyst is essentially quiescent acting somewhat as a scrubbing zone wherein unreacted olefins from the lower well-mixed zone of reactor 4 are polymerized. Products from this zone pass out of reactor 4 through line 6.

Figure 2:
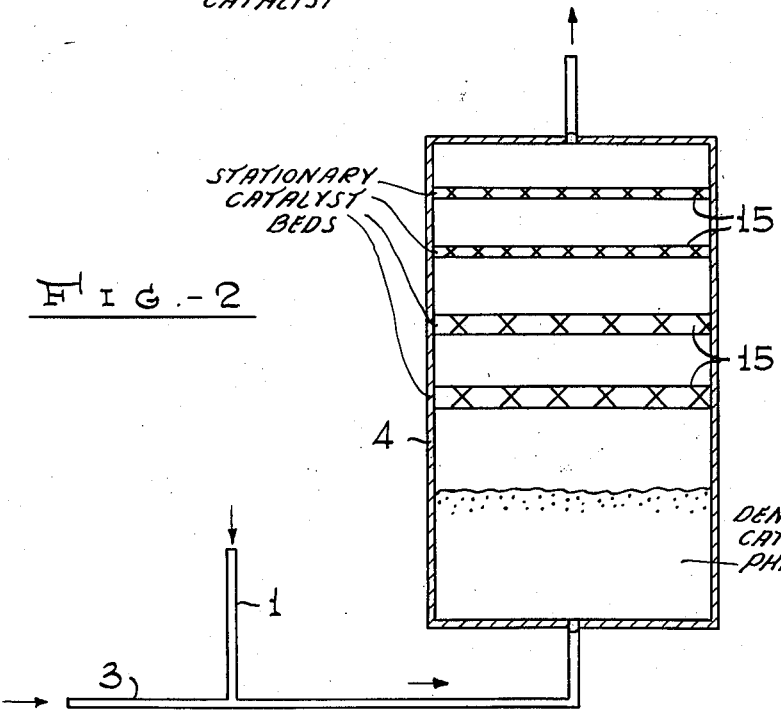
Fig. 2 illustrates another embodiment of the invention similar to Fig. 1 in which the top zone utilizes a stationary catalyst.

In Fig. 2 is shown a second embodiment of the invention in which the same reactor is provided with a well mixed lower section as in Fig. 1 but which in the upper section is provided with catalysts on trays and in which the catalyst from the lower section need not enter. In this case the well mixed catalyst in the lower section is provided with a level which may appear visually like a boiling liquid. Conditions in this reactor are the same as in Fig. 1. The effluent from the suspended catalyst zone in reactor 4 passes upwardly through trays 15 containing piled or lump catalyst. This catalyst may be the same as that used in the lower section or it may be a more reactive catalyst. For example, the catalyst in the lower section may be phosphoric acid deposited on kieselguhr and that in the upper section may be a more active catalyst such as 50% to 90% phosphoric acid deposited on silica gel promoted with 1% to 5% of either nickel or copper phosphate.

Figure 3:
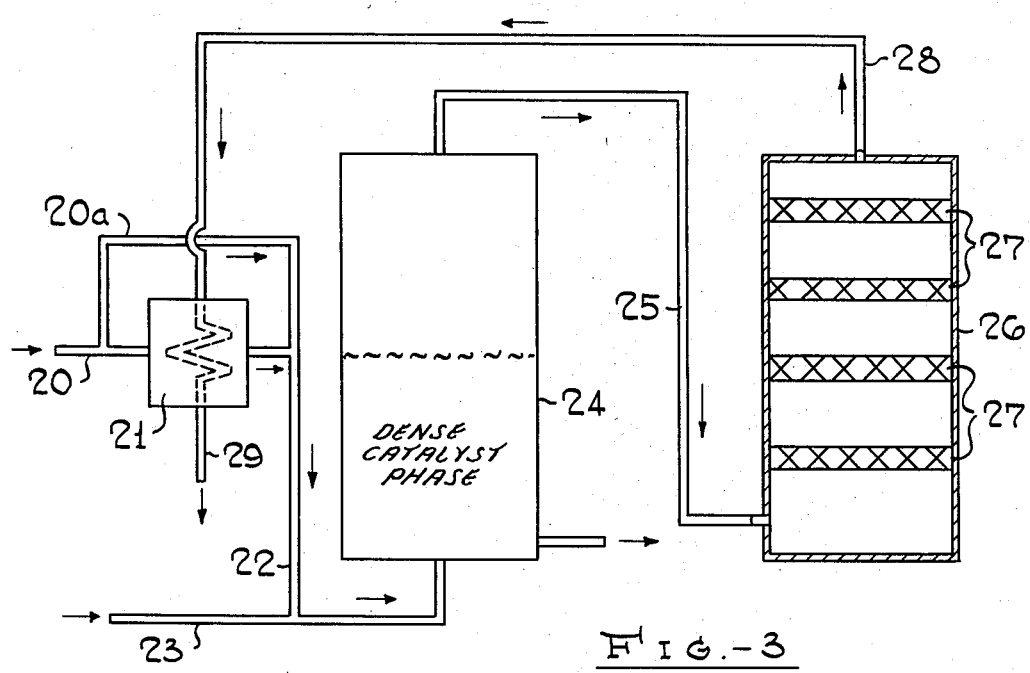
Fig. 3 illustrates an embodiment of the invention in which two separate reactors are employed, a well-mixed slurry catalyst in the first and a stationary bed in the second.

In Fig. 3 is shown an embodiment of the invention similar to that in Fig. 2 except that the two zones of reactor 4 in Fig. 2 are here shown as two separate reactors.

Olefin feed is introduced by line 20 through heat exchanger 21 and line 22 and mixed with make-up polymerization catalyst introduced periodically or continouslly through line 23 and passed into the bottom of reaction zone 24. If desired, the feed may by-pass the heat exchanger 21 by line 20a. The reactants pass upwardly through the catalyst at such a velocity that the catalyst is maintained in suspension and forms a level between a dense and a disperse phase. A temperature of about 450° F. and a pressure of 1000 lbs./sq. in. gage are maintained in reactor 24. Effluent from this reactor passes by line 25 to a second reactor 26. Reactor 26 is filled with trays 27 containing pilled catalyst. Fluid reactants containing small amounts of unreacted olefins pass upwardly through these trays under conditions which may be similar to those maintained in reactor 24 or may be different. For example, it may be desirable to carry out the reaction in reactor 26 under vapor phase conditions in which case the pressure may be lowered to as much as 300 lbs./sq. in. gage.

The catalyst in tower 26 may be the same as that used in reactor 24 or it may be a more active catalyst such as that used in the upper part of reactor 4 of Fig. 2.

Figure 4:
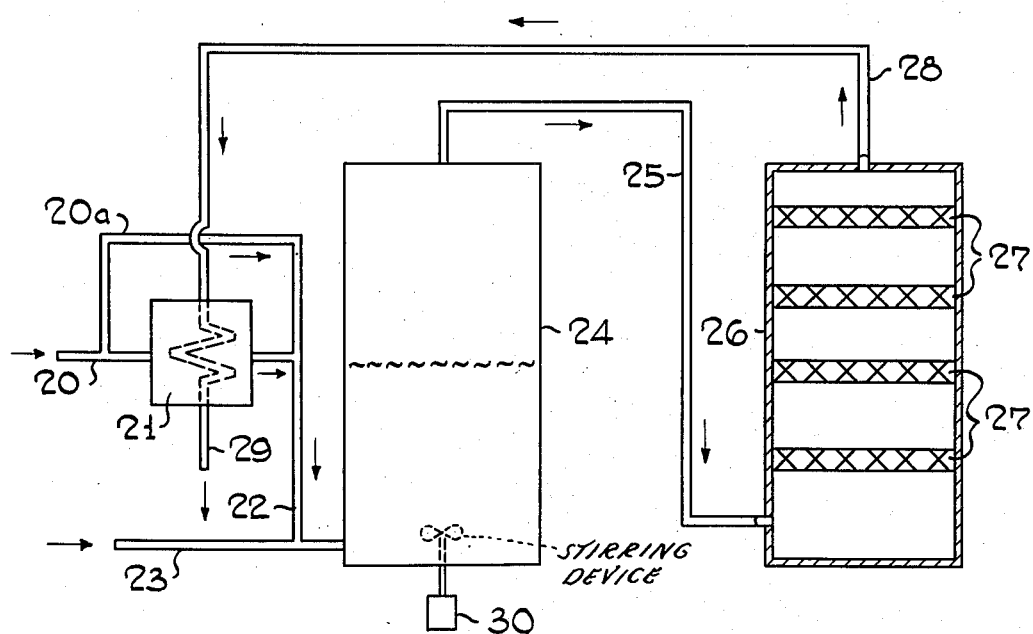
Fig. 4 illustrates an alternative embodiment of the invention according to Figure 3 in which the catalyst is maintained in suspension in the first reaction zone by mechanical stirring.

In reactor 26 all of the unreacted olefins are polymerized and the effluent is removed through line 28 and passed through heat exchanger 21 where its heat is given up to the incoming feed. Cooled product is removed from the heat exchanger through line 29. In order to maintain a more positive agitation of the fluidized catalyst in the reaction zone 24, a mechanical stirring device may be used, as for example agitator 30 shown in Figure 4. The operation of the apparatus in Figure 4 is otherwise the same as in Figure 3.

Figure 5:
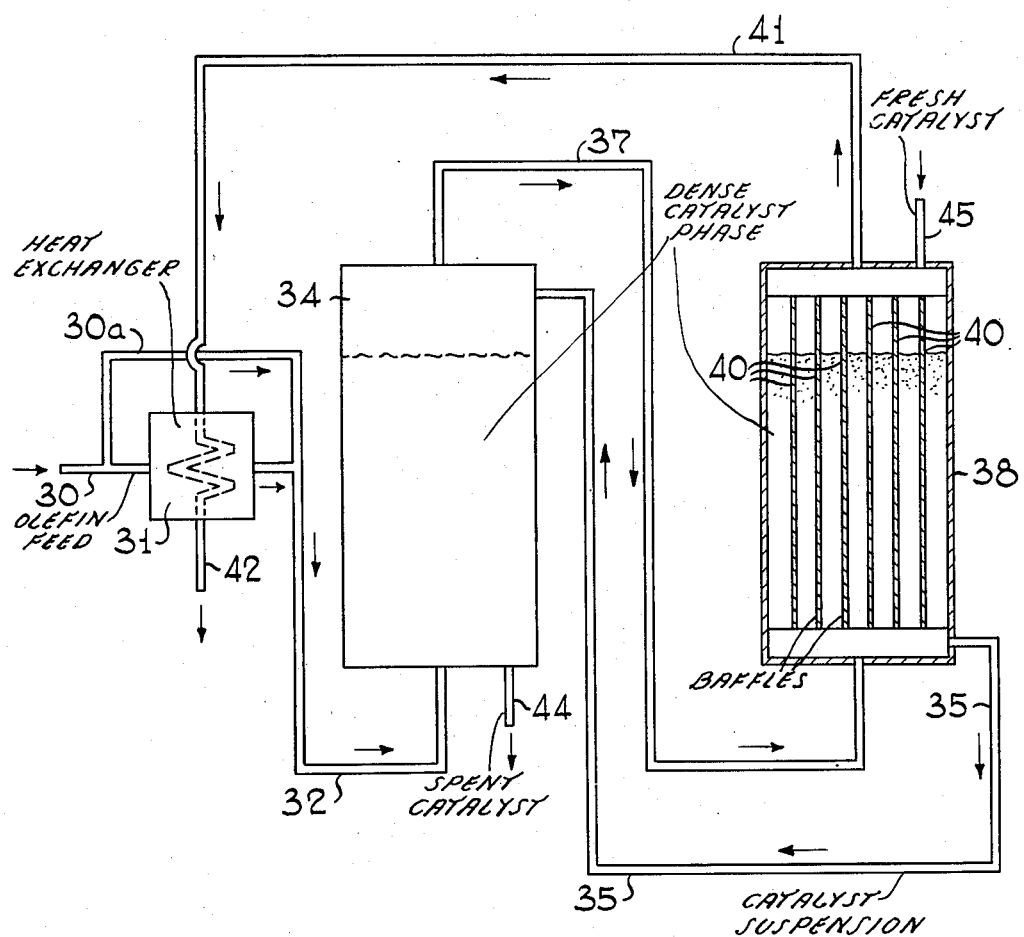
Fig. 5 illustrates another form of the invention shown in Fig. 3 in which slurry catalyst is used in both reactors.

Figure 5 illustrates a process similar to that shown in Fig. 3 except that the catalyst is maintained in suspension in both reactors. In the drawing reactants entering reactor 34 through lines 30, heat exchanger 31 and line 32, are passed upwardly countercurrent to catalyst in suspension in a light oil introduced through line 35. Conditions in this reactor are substantially the same as those employed in reactor 24 of Fig. 3, except that pressures can if desired be maintained at values under which the reactants are in the gaseous state. Effluent from reactor 34 passes by line 37 into reactor 38 and flows countercurrent to any make-up catalyst introduced through line 45. Reactor 38 is provided with baffles 40 to prevent end-to-end mixing to enable unreacted olefins from reactor 34 to be polymerized, thus providing a plurality of areas of restricted cross-section wherein the polymerization occurs.

Effluent from reactor 38 is passed by line 41, heat exchanger 31, and line 42 to product separation equipment. Suspension of catalyst in hydrocarbons is removed from reactor 38 by line 35 and passed to reactor 34. When desired, spent catalyst can be removed through line 44 and fresh catalyst added through line 45.

The present process is non-regenerative; i. e. spent catalyst is removed from the suspension and discarded and is replaced by fresh make-up catalyst as needed.

The nature and objects of the present invention having been thus fully set forth, what is claimed as new and useful and desired to be secured by Letters Patent is:

1. A non-regenerative catalytic process for polymerizing olefins which comprises the steps of passing the olefins through a first zone containing a well mixed suspension of finely divided solid polymerization catalyst in fluid hydrocarbon under conditions whereby most of the olefins are polymerized, passing effluent from said first zone, said effluent comprising polymerized olefins and unreacted olefins, through a second poorly mixed dense zone of solid polymerization catalyst whereby unreacted olefins are substantially completely polymerized, and withdrawing effluent containing polymerized olefins from said second zone.

2. A process in accordance with claim 1 whereby mixing in said first zone is obtained by passing olefins upwardly through said suspension.

3. A process in accordance with claim 1 wherein mixing in said first zone is obtained by mechanical agitation.

4. A process in accordance with claim 1 wherein said second zone consists of at least one bed of stationary catalyst.

5. A process in accordance with claim 1 wherein said second zone consists of a poorly mixed dense suspension of finely divided catalyst in fluid hydrocarbon.

6. A non-regenerative catalytic process for polymerizing normally gaseous olefins which comprises maintaining a first reaction zone including a finely divided solid polymerization catalyst and a second reaction zone including at least one bed of stationary solid polymerization catalyst, introducing feed olefins into said first zone, agitating said olefins and finely divided catalyst whereby a dense suspension of catalyst is formed and substantial mixing and polymerization of olefins occurs, passing effluent from said first zone into contact with catalyst in said second zone in the substantial absence of top to bottom mixing of effluent in said zone, said second zone being maintained at temperature and pressure conditions whereby the unreacted olefins in the effluent are substantially completely polymerized.

7. A process in accordance with claim 6 in which said agitation is achieved by passing olefins upwardly through the catalyst at a velocity sufficient to cause substantial inlet to outlet mixing of olefins in said first zone.

8. A process in accordance with claim 6 in which said agitation is achieved mechanically.

9. A process in accordance with claim 6 in which the temperature in said zones is in the range of 350° to 600° F., and the pressure in said first zone is at least 900 p. s. i. g.

10. A process in accordance with claim 6 in which said finely divided catalyst is a phosphoric acid deposited on a solid carrier having a size in the range of 60 to 200 mesh.

11. A non-regenerative catalytic process for polymerizing normally gaseous olefins which comprises maintaining first and second reaction zones each including a dense suspension of finely divided solid polymerization catalyst in fluid hydrocarbon comprising olefin and polymer, said second zone including a plurality of vertically extending parallel zones each of less cross sectional area than said first zone, introducing said olefins into said suspension in said first zone, agitating said suspension whereby substantial top to bottom mixing of the fluid hydrocarbons occurs and a major portion of the olefin polymerization occurs, passing effluent from said first zone upwardly through the suspension in said second zone wherein substantially no top to bottom mixing of hydrocarbon in said vertically extending zones occurs and the unreacted olefins are substantially completely polymerized.

12. A process in accordance with claim 11 in which the suspension in said first zone is agitated by passing olefins upwardly therethrough at a velocity sufficient to cause substantial top to bottom mixing of hydrocarbons therein.

13. A process in accordance with claim 11 in which the suspension in said first zone is mechanically agitated.

14. A process in accordance with claim 11 in which the temperature in said zones is in the range of 350° to 600° F. and the pressure in said first zone is at least 900 p. s. i. g.

15. A process in accordance with claim 11 in which said catalyst is a phosphoric acid deposited on a solid carrier having a size in the range of 60 to 200 mesh.

16. A process in accordance with claim 11 which comprises charging fresh catalyst to the upper portion of said second zone, withdrawing suspension of catalyst in hydrocarbons from the bottom portion of said second zone and charging it to the upper portion of said first zone, and withdrawing substantially spent catalyst from the bottom portion of said first zone.

17. A process in accordance with claim 11 in which said second zone includes a plurality of vertically extending baffles defining said vertically extending zones.

18. A process in accordance with claim 17 in which said baffles are positioned in the upper portion of said first zone and said suspension extends from said first zone up into said vertically extending zones.

FRANCIS R. RUSSELL.

REFERENCES CITED

The following references are of record in the file of this patent:

UNITED STATES PATENTS

| Number | Name | Date |
|---|---|---|
| 2,354,261 | Hemminger | July 25, 1944 |
| 2,359,310 | Hemminger | Oct. 3, 1944 |
| 2,444,990 | Hemminger | July 13, 1948 |
| 2,455,561 | Creelman | Dec. 7, 1948 |
| 2,488,406 | Hirsch | Nov. 15, 1949 |
| 2,509,751 | Watson | May 30, 1950 |
| 2,557,680 | Odell | June 19, 1951 |